(12) United States Patent
Starkweather

(10) Patent No.: US 8,380,012 B2
(45) Date of Patent: Feb. 19, 2013

(54) DOCUMENT IMAGING AND INDEXING SYSTEM

(75) Inventor: Gary K. Starkweather, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2120 days.

(21) Appl. No.: 11/053,079

(22) Filed: Feb. 8, 2005

(65) Prior Publication Data

US 2005/0160115 A1 Jul. 21, 2005

Related U.S. Application Data

(62) Division of application No. 09/862,728, filed on May 22, 2001.

(51) Int. Cl.
*G06K 9/60* (2006.01)
(52) U.S. Cl. ........................................ 382/305
(58) Field of Classification Search .......... 382/173–180, 382/301, 305, 306; 707/613
See application file for complete search history.

(56) References Cited

U.S. PATENT DOCUMENTS

| | | | |
|---|---|---|---|
| 5,133,024 A | 7/1992 | Froessl | |
| 5,168,565 A | 12/1992 | Morita | |
| 5,623,679 A | 4/1997 | Rivette et al. | |
| 5,765,176 A | 6/1998 | Bloomberg | |
| 5,819,261 A * | 10/1998 | Takahashi et al. | 707/3 |
| 5,825,943 A * | 10/1998 | DeVito et al. | 382/306 |
| 5,873,076 A * | 2/1999 | Barr et al. | 707/3 |
| 5,987,459 A * | 11/1999 | Swanson et al. | 707/6 |
| 6,182,090 B1 | 1/2001 | Peairs | |
| 6,208,988 B1 * | 3/2001 | Schultz | 707/5 |
| 6,341,176 B1 | 1/2002 | Shirasaki et al. | |
| 6,389,163 B1 | 5/2002 | Jodoin et al. | |
| 6,480,838 B1 | 11/2002 | Peterman | |
| 6,687,404 B1 | 2/2004 | Hull et al. | |
| 6,704,465 B2 | 3/2004 | Aoi et al. | |
| 6,765,559 B2 | 7/2004 | Hayakawa | |
| 6,836,565 B1 | 12/2004 | Nishikawa | |
| 2001/0041021 A1 | 11/2001 | Boyle et al. | |
| 2002/0059189 A1 * | 5/2002 | Hanes et al. | 707/2 |

OTHER PUBLICATIONS

Starkweather, G.K., Architect-Microsoft Research, "PEDISTAL, A Personal Document Imaging System", Hardware Devices Group, Oct. 2000, 14 pages.
Story et al. "The RightPages image-based electronic library for alerting and browsing", I.E.E.E. Computer, vol. 25, pp. 17-26, Sep. 1992.
Nagy et al. "A Prototype Document Image Analysis System for Technical Journals", I.E.E.E. Computer, vol. 25, pp. 10-22, Jul. 1992.
O'Gorman, "Image and Document Processing Techniques for the RightPages Electronic Library System", I.E. E. E. Pattern Recognition, vol. 2, pp. 260-263, Aug. 1992.

* cited by examiner

*Primary Examiner* — Brian Le
(74) *Attorney, Agent, or Firm* — Woodcock Washburn LLP

(57) ABSTRACT

A document digitizing method digitizes and automatically indexes documents in printed form. The method includes optically scanning the document, forming and storing a digitized image file from the optically scanned document, optically recognizing characters in the optically scanned document, and forming and storing a text file of the optically recognized characters in document. A retrieval method for retrieving the digitized image file for a document includes searching the text files to identify any having a selected text string and providing access to the digitized image files that correspond to those text files. The digital image file and the text file together represent a digitized document data structure that combines a digital image of a document with a text file of optically recognized characters in the digital image.

17 Claims, 4 Drawing Sheets

DOCUMENT IMAGING AND INDEXING SYSTEM

CROSS REFERENCE TO RELATED APPLICATIONS

This application is a divisional application of U.S. patent application Ser. No. 09/862,728, filed May 22, 2001, which is incorporated herein by reference in its entirety.

FIELD OF THE INVENTION

The present invention relates to storage and retrieval of digitized images of printed documents and, in particular, to a simple document imaging system with automatic indexing.

BACKGROUND OF THE INVENTION

The development and availability of personal computers and personal printers have brought with them repeated predictions that the paperless office is at hand. It is not yet so. Instead, the use of office bond paper continues to grow year after year. Even workplaces that minimize the generation of paper (i.e., printed) documents by use of e-mail, online and networked resources, etc., commonly receive large numbers of printed materials and documents. Rather than the paperless office, it appears that the foreseeable achievable accomplishment will be the management of printed documents.

The age-old solution has been to store printed documents in large repositories called files. In addition to large amounts of space, such repositories require manual indexing systems to keep the documents in order for retrieval, as well as staffing for physically placing documents in the files and retrieving them. As a consequence, conventional file storage systems for printed documents are relatively large and are surprisingly expensive to maintain when all costs are considered.

In response to the significant costs and requirements of maintaining conventional printed document files, computerized or digitized document storage systems have been developed. One of the simplest digital document storage systems is simply maintaining in electronic form documents that are originally generated in that form. For example, computer storage of word processing documents, e-mail communications, etc., simply maintains such documents in the electronic form in which they were created.

Of greater complexity are systems that convert printed or other written materials, generically referred to herein as printed documents, into a digitized form for storage on computer-readable media. Such systems characteristically employ optical scanners that form digitized images of the printed documents for storage in a computer storage medium, and software for creating indices or other identifying information for retrieving the digitized images at a later time. In most such systems, indexing information is manually entered by a user into a computer system. For example, the indexing information could include conventional file reference information of the type used for conventional paper files (e.g., file reference names or numbers).

This type of digitized document storage system may be a suitable substitute for paper document storage in many business contexts. Staff who might otherwise by physically storing and retrieving paper documents can provide the indexing information and potentially process greater numbers of digitized documents for storage. In addition, many such business contexts have existing document indexing formats that may be applied to the digitized storage.

However, such manual indexing might not be suitable in other business contexts, such as smaller businesses, or for individual users. For these users, the effort of manually indexing digitized documents for storage can pose a barrier to adoption of digitized document storage. For example, there often may not be suitable formal file format for indexing the digitized documents.

SUMMARY OF THE INVENTION

Accordingly, an aspect of the present invention is a document digitizing method for digitizing and automatically indexing documents in printed form. The method includes optically scanning the document, forming and storing a digitized image file from the optically scanned document, optically recognizing characters in the optically scanned document, and forming and storing a text file of the optically recognized characters in document. The text file and the digital image file for a document are associated with each other. For example, the associated text and digital image files may have a common name and may be distinguished by appropriate file extensions.

The digital image file and the text file together represent a digitized document data structure that combines a digital image of a document with a text file of optically recognized characters in the digital image. The text file functions as a searchable index for retrieving the digital image files corresponding to the document. As a result, the text file functions as an automatically-generated index of the digital image file and the document pages they represent. In one implementation, the document includes plural pages and a separate digitized image file and text file is formed for each page of the document.

Another aspect of the invention is a retrieval method for retrieving the digitized image file for a document. The retrieval method includes searching the text files to identify any having a selected text string and providing access to the digitized image files that correspond to those text files. For example, the access to the digitized image files may include allowing a user to selectively display any digitized image file that corresponds to an identified text file.

Additional objects and advantages of the present invention will be apparent from the detailed description of the preferred embodiment thereof, which proceeds with reference to the accompanying drawings.

DETAILED DESCRIPTION OF ILLUSTRATIVE EMBODIMENTS

Figure 1:
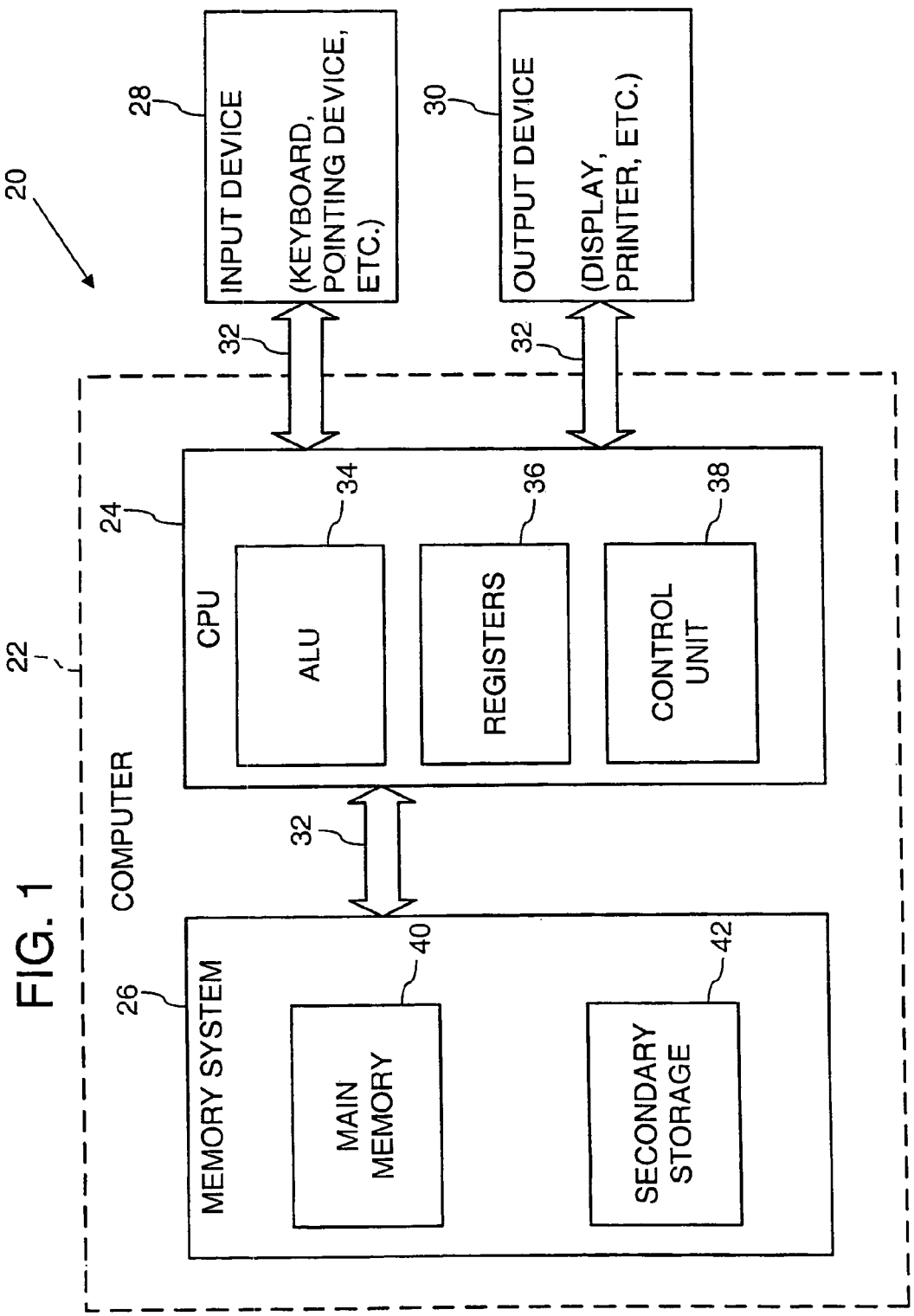
FIG. 1 illustrates an operating environment for an embodiment of the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. In addition, input device 28 includes an optical scanner that optically scans printed and other written documents or materials (together referred to as printed documents) to generate digitized images of them. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system operation and the allocation of resources. The application program is the set of software that performs a task desired by the user, using computer resources made available through the operating system. Both are resident in the illustrated memory system 26.

In conjunction with the referenced optical scanner input device 28, computer system 20 includes software for controlling the optical scanner and for generating digitized images of scanned documents. Computer system 20 also includes optical character recognition software, as is known in the art, for discerning under computer control text characters in a scanned document and generating a corresponding text computer file.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
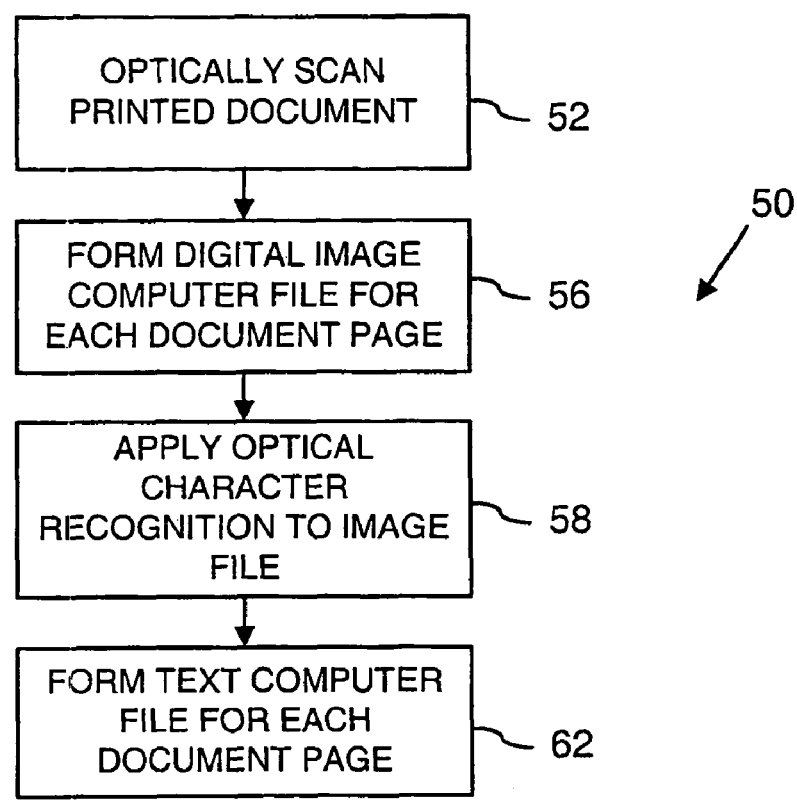
FIG. 2 is a flow diagram of a document digitizing method of the present invention that can provide simple automatic imaging and indexing of digitized documents.

FIG. 2 is a flow diagram of a document digitizing method 50 of the present invention that can provide automatic imaging and indexing of digitized documents. Digitizing method 50 employs conventional optical scanning of written or printed materials or documents to generate digital images of documents and automatically generates an indexing file to aid in retrieval of the documents.

It will be appreciated that references to "printed documents" or "written or printed materials" are inclusive of virtually any paper or other medium with text characters on it. There may be images or pictures interspersed with the text characters, and some pages of a document may have no text characters at all. For best utilization of the present invention, at least some of the text characters on at least one page of a document will be discernible by optical character recognition software.

Process block 52 indicates that a document is optically scanned to form a digital image file 54 (FIG. 3) for each page of the document. At least one page of the document includes text characters discernible by optical character recognition software. In an exemplary implementation, each digital image file 54 may be of a Tag Image File (.tif) format or another lossless image format, or may alternatively be of a lossy image format such as JPEG. In addition, each digital image file 54 may be compressed, such as by CCITT Group 4 compression for .tif files. It will be appreciated that other compression formats may be used for .tif file format images, as well as other lossless or lossy file formats.

Process block 56 indicates that digital image computer file 54 for each page of the document is stored under a file indicator or name that is selected in a predefined manner. In one implementation, digital image files 54 may be stored under numeric, alphabetic, or alphanumeric file indicators or names that increment sequentially for all digital image files 54 generated by method 50. For example, document digitizing method 50 may over time be applied to thousands of documents encompassing thousands of digital image files 54. The file indicators or names for the pages of a most recent document could be the next successive numeric, alphabetic, or alphanumeric in sequence from the preceding digital image files 54.

Process block 58 indicates that optical character recognition is applied to each digital image file 54, or a copy or alternative form of it, to discern text characters in and form a text file 60 (FIG. 3) for each corresponding page of the document. For example, optical character recognition is applied to all text characters in the optically scanned document. Application of optical character recognition to all text characters means that optical character recognition is attempted throughout the optically scanned document. It will be appreciated, however, that due to various circumstances, not all text characters will necessarily be recognized by the optical character recognition software.

In an exemplary implementation, each text file 60 may be of a format with minimal or no embedded coding and minimal text formatting, such as ASCII characters in a .txt file format. Other text file formats could alternatively be used, but the .txt file format is desirable because it simplifies the optical character recognition and minimizes the storage requirements of text files 60. The optical character recognition may be performed by any optical character recognition software, such as any of a variety of commercially available optical character recognition software programs including OmniPage Pro™ from Caere Inc., TextBridge™ and Pagis Pro™ from Xerox Corporation, and TypeReader™ 5.0 by Expervision, Inc.

Process block 62 indicates that text file 60 for each page of the document is stored under a file indicator or name that is selected in a predefined manner. In one implementation, text files 60 may be stored under numeric, alphabetic, or alphanumeric file indicators or names that increment sequentially for all text files 60 generated by method 50. For example, text file 60 for each page may have the same numeric, alphabetic, or alphanumeric file indicators or names as the corresponding digital image file 54, but have a different file extension to distinguish the text and image files (e.g., .txt and .tif). Such common names for corresponding text and digital image files 54 represents a simplest manner of correlating corresponding files.

In alternative implementations, the corresponding text and digital image files 54 could have different names. However, such implementations would require an algorithm, a table, or another manner of correlating the corresponding text and digital image files 54.

Figure 3:
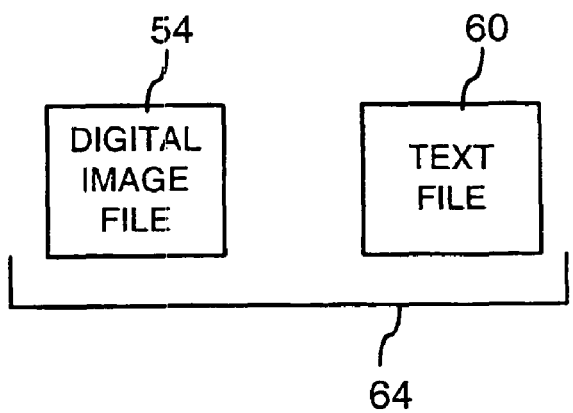
FIG. 3 is a block diagram representing a digitized document data structure according to the present invention.

Digital image files 54 and text files 60 of FIG. 3 together represent a digitized document data structure 64 that combines a digital image of each page of the document with a text file of optically recognized characters in the digital image. As described below in greater detail, the text file functions as a searchable index for retrieving the digital image files corresponding to a document. As a result, text files 60 function as an automatically-generated index of digital image files 54 and the document pages they represent.

Figure 4:
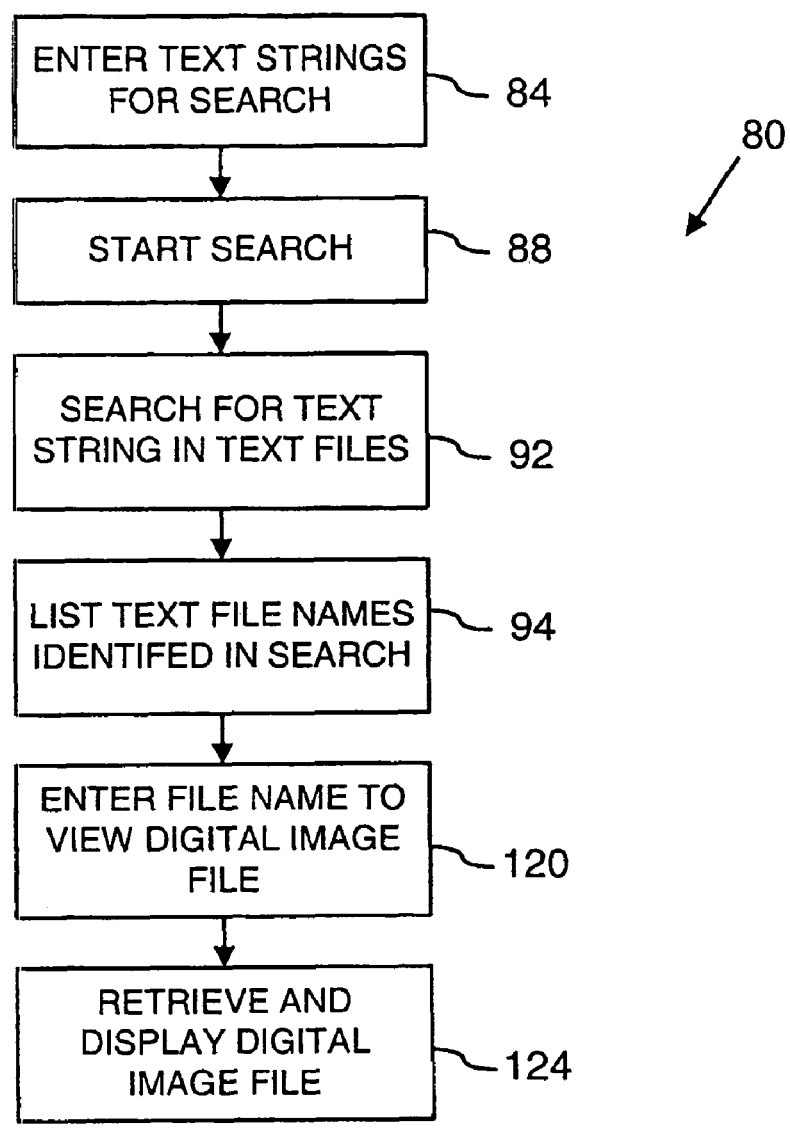
FIG. 4 is a flow diagram of a digitized document retrieval method for retrieving digitized documents stored in accordance with the document digitizing method of FIG. 2.

FIG. 4 is a flow diagram of a digitized document retrieval method 80 for retrieving digitized documents stored in accordance with document digitizing method 50 or having digitized document data structure 64. Digitized document retrieval method 80 is described with reference to an exemplary graphical user interface 82 (FIG. 5) that would be rendered on a computer display screen.

Process block 84 indicates that one or more text strings to be searched for within text files 60 are entered by a user. In user interface 82, for example, a selected text string to be searched for may be entered into a text box 86. Text box 86 illustrates a user interface feature for searching a single text string, but user interface 82 further allows searching of multiple text strings conjunctively, as described below.

Process block 88 indicates that a search is commenced, such as when a user activates a graphical control like a button 90 in user interface 82.

Process block 92 indicates that text files 60 are searched to identify any with the one or more text strings.

Process block 94 indicates that the names of the text files 60 identified as having the one or more text strings are listed, such as in a display for viewing by the user. In user interface 82, for example, text files 60 identified as having an initial text string may be listed in a search result box 96. Alternatively, the names of the text files 60 identified as having the one or more text strings may be listed in a search results computer file stored on the computer system to be accessed later by the user.

A first additional conjunctive text string may be listed in a text box 98, and a first additional conjunctive text string search may be commenced when a user activates a graphical control like a button 100. Text files 60 identified as having the initial text string of text box 86 and the first additional conjunctive text string of text box 98 may be listed in a search result box 102. Likewise, a second additional conjunctive text string may be listed in a text box 104, and a second additional conjunctive text string search may be commenced when a user activates a graphical control like a button 106. Text files 60 identified as having the initial text string of text box 86 and the first and second additional conjunctive text strings of text boxes 98 and 104 may be listed in a search result box 108. The numbers of text files 60 listed in search results boxes 96,102, and 108 may be indicated in respective search results file number boxes 110,112, and 114. A Remove Selected Item control 116 initiates deletion of files that are selected or highlighted in one of search results boxes 96, 102, and 108. A selected items count box 118 indicates the number of items that are selected or highlighted in one of search results boxes 96,102, and 108.

It will be appreciated that separate controls and search result boxes for initial and successive conjunctive text string searches is merely one graphical user interface implementation. Alternatively, such conjunctive searches may be entered into a single search text box, as is common with many computer search tools. Moreover, other implementations could include any the Boolean combinations of text strings commonly employed with computer search tools.

Process block 120 indicates that a file name or indicator corresponding to a digital image file 54 to be viewed is entered by the user. For example, the file name or indicator may be that of a text file 60 listed in a search results box, such as one of boxes 96, 102, and 108. The user may manually enter the file name or indicator, or may enter it by selecting (e.g., "single clicking") or activating (e.g., "double clicking") text file 60 listed in a search results box. As described above, each text file 60 corresponds to a digital image file 54. In user interface 82, for example, the file name or indicator may be entered into a text box 122.

Process block 124 indicates that digital image file 54 corresponding to the entered file name or indicator is retrieved and displayed, such as when a user activates a graphical control like a button 126 in user interface 82.

Digitized document retrieval method 80 provides retrieval of digital image files based upon text strings in corresponding text files 60. As a result, text files 60 of digitized document data structure 64 provide an automatic indexing structure for accessing corresponding digital image files 54. Sometimes a searched text string will provide access to one page of a digitized document when another page of the document is actually desired. Accordingly, user interface 82 includes a show next image control 128 for displaying the next successive digital image file 54 and a show previous image control 130 for displaying the immediately preceding digital image file 54. Controls 128 and 130 allow a user to scroll to successive pages of a document. In this regard, it is desirable that digitizing method 50 be applied to documents with their pages in regular order or sequence.

Figure 5:
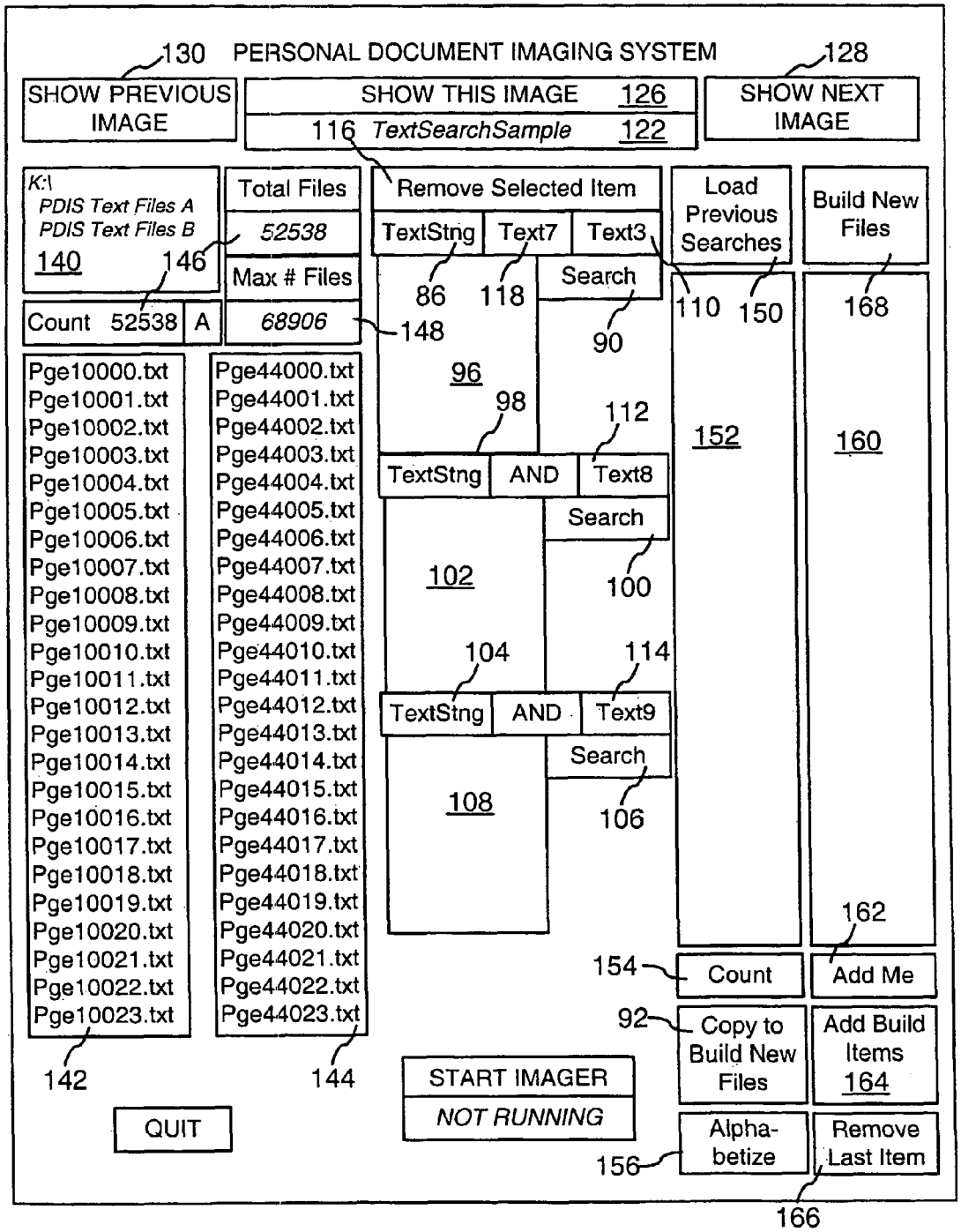
FIG. 5 is a simplified diagram of an exemplary graphical user interface for the digitized document retrieval method of FIG. 4.

The implementation of user interface 82 shown in FIG. 5 includes features in addition to the features described above with reference to digitized document retrieval method 80. For example, user interface 82 includes a text file directory navigation window 140 listing one or more operating system directories or folders in which text files 60 are stored. Multiple directories or folders may be used to overcome operating system limits on the numbers of files in a directory or folder or to organize digitized documents in a user-defined manner.

Selection of a directory or folder listed in text file directory navigation window 140 accesses the text files 60 in a selected directory or folder and lists at least a portion of the text files 60 in a text file listing window 142. A second text file listing window 144 allows text files 60 in a second selected directory or folder to be listed. Text file count windows 146 list the numbers of files in one or all of the directories or folders, and a maximum text file count window 148 lists the maximum number of text files that can be accommodated.

To minimize system resources and time required for repeated searches, user interface 82 includes a Load Previous Searches control 150 operable by a user to retrieve results of previous text string searches, with the text strings themselves being listed in a Previously Searched Tex:t Strings window 152. For example, the results of searches for the previous n-number of most recent text string searches may be stored in a search results file that correlates the text string searched with the names of the text files identified in the search. Selection of a text string listed in Previously Searched Text Strings window 152 loads the corresponding listing of identified text files 60 into search result box 96.

In an alternative implementation, the search results file may include only the previously searched text strings, and not the text file listings generated from the previous searches. In this implementation, selection of a text string in Previously Searched Text Strings window 152 would cause the text string to be copied to search term text box 86, so that activation of control 90 would initiate a new search of the indicated text string.

A previous search term count window 154 indicates a numeric count of the number of text strings included in the text string searches file, and an "alphabetize" control 156 allows a user to alphabetize the listing of text strings displayed in Previously Searched Text Strings window 152.

A batch search text string window 160 lists one or more text strings for which searches of text files 60 are to be conducted, such as in a batch of multiple successive searches. Such batched searches may commonly be distinguished from individual searches for which a user would desire search results immediately upon completion of the search. A text string may be added to batch search text string window 160 by first entering the text string into an entry window 162 and activating an add item control 164. A text string may be removed from batch search text string window 160 by selecting the text string and activating a remove item control 166. The batched searching of text strings listed in batch search text string window 160 is commenced upon user activation of a batch search graphical control 168 and may continue that are executed in the user's absence. It will be appreciated, however, that such batched searching could be used by a user wanting search results immediately.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

What is claimed:

1. A method of retrieving a digitized image file from a document storage system, the document storage system comprising a plurality of digitized image files and a plurality of text files, wherein each digitized image file is associated with a text file of text characters and comprises a digitized image of a printed document comprising the text characters in printed form, the method comprising:
   searching by a computer processor the plurality of text files to identify a plurality of first text files comprising at least one of a plurality of separate first text strings, wherein the plurality of first text files was generated using optical character recognition of the plurality of digitized image files, wherein searching the plurality of text files to identify the plurality of first text files comprising the at least one of the plurality of first text string comprises:
      specifying the plurality of separate first text strings; and
      searching the plurality of text files in a batch to identify which of the plurality of first text files has any of the plurality of separate first text strings;
   searching by a computer processor the plurality of first text files to identify a second text file comprising a second text string, wherein the second text file is associated with a second digitized image file, wherein the second text file was generated using optical character recognition of the second digitized image file; and
   providing access to the second digitized image file by enabling a user to select the second digitized image file for display.

2. The method of claim 1, wherein providing access to the second digitized image file comprises:
   determining a name of the second text file;
   determining a name of the second digitized image file from the name of the second text file; and
   displaying the name of the second digitized image file.

3. The method of claim 1, wherein each digitized image file comprises a name and a file extension,
   wherein each text file comprises a name and a file extension, and
   wherein the name of each digitized image file is the same as the name of the text file with which it is associated.

4. The method of claim 3, wherein the file extension of each digitized image file is different than the file extension of the text file with which it is associated.

5. The method of claim 1, wherein each digitized image file comprises a name,
   wherein each text file comprises a name,
   wherein the document storage system comprises a mapping table, and
   wherein the mapping table comprises the name of each digitized image file and the name of the text file with which the digitized image file is associated.

6. A document retrieval system, comprising:
   a plurality of digitized image files and a plurality of text files, wherein each digitized image file is associated with a text file of text characters and comprises a digitized image of a printed document comprising the text characters in printed form;
   means for searching the plurality of text files to identify a plurality of first text files comprising at least one of a plurality of separate first text strings, wherein the plurality of first text files was generated using optical character recognition of the plurality of digitized image files, wherein searching the plurality of text files to identify the plurality of first text files comprising the at least one of a plurality of separate first text strings comprises:
      specifying the plurality of separate first text strings; and
      searching the plurality of text files in a batch to identify which of the plurality of first text files has any of the plurality of separate first text strings;
   means for searching the plurality of first text files to identify a second text file comprising a second text string, wherein the second text file is associated with a second digitized image file, wherein the second text file was generated using optical character recognition of the second digitized image file; and
   means for providing access to the second digitized image file.

7. The system of claim 6, further comprising:
   means for determining a name of the second text file;

means for determining a name of the second digitized image file from the name of the second text file; and means for displaying the name of the second digitized image file.

8. The method of claim 1 further comprising:

storing a name of the second text file, wherein each text file comprises a name.

9. The method of claim 1, wherein each text file is generated by computer optical character recognition of the digitized image file with which the text file is associated.

10. A computer-readable medium that is not a signal or a transmission carrier wave, the computer-readable medium having computer-executable instructions for performing steps, comprising:

searching, in a document storage system, a plurality of text files to identify at least one of a plurality of first text files that has at least one of a plurality of separate first text strings, wherein the plurality of first text files was generated using optical character recognition of a plurality of digitized image files, wherein searching the plurality of text files to identify the at least one of the plurality of first text files that has the at least one of a plurality of separate first text strings comprises:

specifying the plurality of separate first text strings; and searching the plurality of text files in a batch to identify which of the plurality of first text files has any of the plurality of separate first text strings;

searching the plurality of first text files to identify a second text file comprising a second text string, wherein the second text file is associated with a second digitized image file, wherein the second text file was generated using optical character recognition of the second digitized image file; and providing access to the second digitized image file, wherein the document storage system comprises the plurality of text files and the plurality of digitized image files, wherein each digitized image file of the plurality of digitized image files is associated with a text file of the plurality of text files, and wherein each text file of the plurality of text files comprises text characters and each digitized image file of the plurality of digitized image files comprises a digitized image of a printed document comprising the text characters in printed form.

11. The computer-readable medium of claim 10, having further computer-executable instructions for performing the steps of:

determining a name of the second text file;

determining a name of the second digitized image file from the name of the second text file; and displaying the name of the second digitized image file.

12. The computer-readable medium of claim 10, wherein each digitized image file comprises a name and a file extension, wherein each text file comprises a name and a file extension, and wherein the name of each digitized image file is the same as the name of the text file with which it is associated.

13. The computer-readable medium of claim 12, wherein the file extension of each digitized image file is different than the file extension of the text file with which it is associated.

14. The computer-readable medium of claim 10, wherein each digitized image file comprises a name, wherein each text file comprises a name, wherein the document storage system comprises a mapping table, and wherein the mapping table comprises the name of each digitized image file and the name of the text file with which the digitized image file is associated.

15. The system of claim 6, wherein each text file comprises a name and a file extension, and wherein the name of each digitized image file is the same as the name of the text file with which it is associated.

16. The system of claim 15, wherein the file extension of each digitized image file is different than the file extension of the text file with which it is associated.

17. The system of claim 6, further comprising:

a mapping table comprising a name of each digitized image file and a name of each text file with which the digitized image file is associated, wherein each digitized image file of the plurality of digitized image files and each text file of the plurality of text files comprises a name.

\* \* \* \* \*